March 31, 1953  H. H. SCHNECKLOTH  2,633,498
SELECTING AND TWO-WAY TRANSLATING SYSTEM
Filed Dec. 29, 1948  7 Sheets-Sheet 1

| FIG.2 | FIG.3 | FIG.4 |

FIG. 6

| FIG.7 | FIG.9 |
| FIG.3 | FIG.8 |

INVENTOR
H. H. SCHNECKLOTH
BY
William F. Simpson.
ATTORNEY

Patented Mar. 31, 1953

2,633,498

UNITED STATES PATENT OFFICE 2,633,498

SELECTING AND TWO-WAY TRANSLATING SYSTEM

Harry H. Schneckloth, Forest Hills, N. Y., assignor to Bell Telephone Laboratories, Incorporated, New York, N. Y., a corporation of New York Application December 29, 1948, Serial No. 67,919

13 Claims. (Cl. 179—18)

This invention relates to translator and cross-reference devices. More particularly the invention relates to high-speed cross-reference and translating devices employing electronic tubes and relating equipment.

The object of this invention is to provide a simplified electronic translator or cross-reference system which can be employed for a wide variety of different services, which is capable of operating at high speed. For example, in stock control and inventory problems, it is sometimes desirable to refer to an item by a piece-part number or designation and at other times desirable to refer to the same item by an inventory or stock control number. The translator in accordance with this invention may be used to determine readily and rapidly either of these numbers from the other. Another example is where it is desirable to refer to an item by catalog number at times, and at other times by any one of a plurality of different numbers such as an invoice number, location number, suppliers' information, etc. A translator in accordance with this invention also finds use in communication switching systems, where it is sometimes necessary or desirable to refer to subscribers' lines by means of a subscriber directory number and at other times, it is desirable or necessary to refer to the subscriber line in terms of its location on a switching frame, switch, etc. Translators in accordance with this invention may be employed to determine either of these numbers if the other is known. By way of example, a specific embodiment of the translator is described herein, which has been designed for use in the number group circuit of so-called No. 5 cross bar telephone machine switching systems. This telephone machine switching system is described in detail in an application for United States Letters Patent of Busch, Serial No. 57,394, filed October 29, 1948. The called subscriber's directory number as dialed by the calling subscriber is stored in an originating register and later transferred to a marker circuit. The marker circuit then calls in a number group circuit which number group circuit takes the dialed number which is the directory number of the called subscriber's line and translates this number into other numbers or symbols designating the actual position of subscriber's line on the frame and position upon a switch on that frame so that the marker may then establish a connection to the desired subscriber's line under control of the designation of the location of the line in the switching office.

A feature of this invention relates to control circuits for cold cathode gas discharge tubes having a cathode and a plurality of anodes. The electrodes of each of the tubes are arranged in a plurality of groups as, for example, an input group and an output group or as one group of electrodes being associated with one side or portion of the translator and another group being associated with another side or portion of the translator. In the exemplary embodiment set forth herein, these electrodes are arranged in two groups. The invention, however, is not limited to arranging these electrodes in two groups. Each group of the electrodes is associated with a given type of information to be translated into information of the other groups. The tube is constructed so that a predetermined voltage difference between the cathode and some anode must be exceeded before a current discharge is initiated through the tube. However, once the discharge is initiated within the tube a flow of current will be maintained between the element of the tube by lower voltage between these elements. Furthermore a discharge may be transferred to other elements within the tube when the voltage between these other elements is less than required to initiate a flow of currents through the tube in the first instance. Novel features of tubes of this type disclosed herein but not claimed are claimed in a copending application for United States Letters Patent of Depew and Depp, filed March 5, 1948, Serial No. 13,284, the disclosure of which application is hereby made a part of this present specification as if fully set forth therein.

Another feature in this invention is having a plurality of discharge tubes wherein a discharge is initiated between a plurality of electrodes of a group of tubes, then the discharge transferred to one or more other electrodes of a portion of the tubes of the group of tubes and the discharge extinguished in the other tubes of the group. The above process is then repeated until a discharge continues to flow through one tube. At this time potential is applied to the output electrodes of all the tubes of the translator. This potential is sufficient to cause a discharge to be transferred to the output electrodes of the single tube through which the discharge current is flowing but is not sufficient to initiate a discharge to the output electrode of any of the other tubes. The output electrodes of this tube are connected to relays, indicators, a group of lamps, or other devices which give register or utilize the desired output number translations.

Another feature of this invention relates to an electronic translator or cross-reference system which operates in both directions. That is, each number of one of the groups of numbers may be translated to a predetermined number of the other group by supplying the desired information to the proper side of the translator or the cross-reference system, the corresponding number being obtained on the other side of the device.

Another feature of this invention relates to control apparatus which may be employed to control a selection of one of a plurality of tubes in the manner described above one step at a time.

Another feature of this invention relates to high-speed control means which operates a high-speed selector to select the desired tube and may thereafter obtain the desired output information.

The foregoing and other objects and features of this invention may be more readily understood from the following description, when read with reference to the accompanying drawings in which:

Fig. 1 shows a manner in which Figs. 2, 3 and 4 are arranged adjacent one another;

Figs. 2, 3 and 4 show one embodiment of a translator or cross-reference system of general application;

Fig. 6 shows the manner in which Figs. 3, 7, 8 and 9 are arranged adjacent one another to show an embodiment of this invention suitable for use in a number group circuit of No. 5 cross-bar system referred to above and described in detail in the above-identified patent application.

Figures 1, 2, 6:
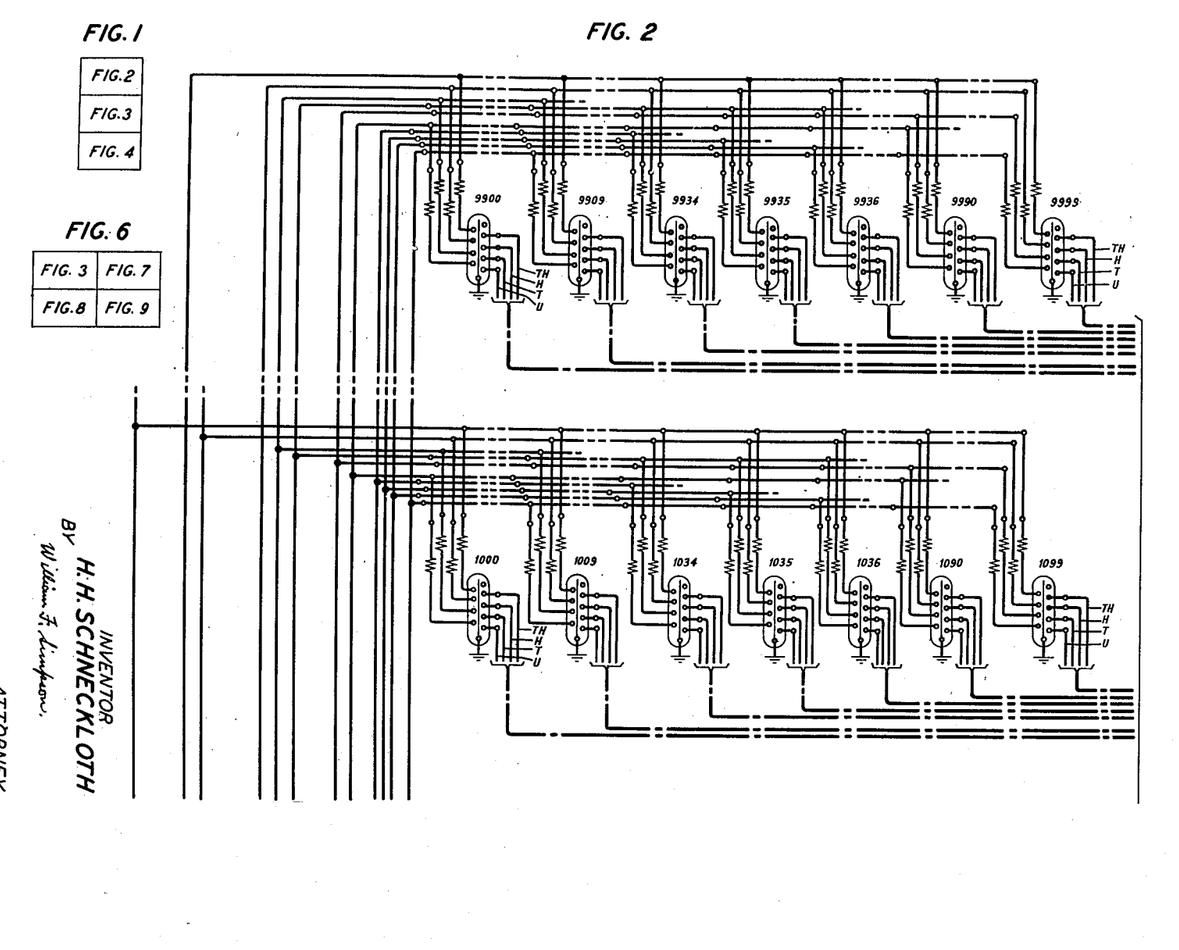
Figure 3:
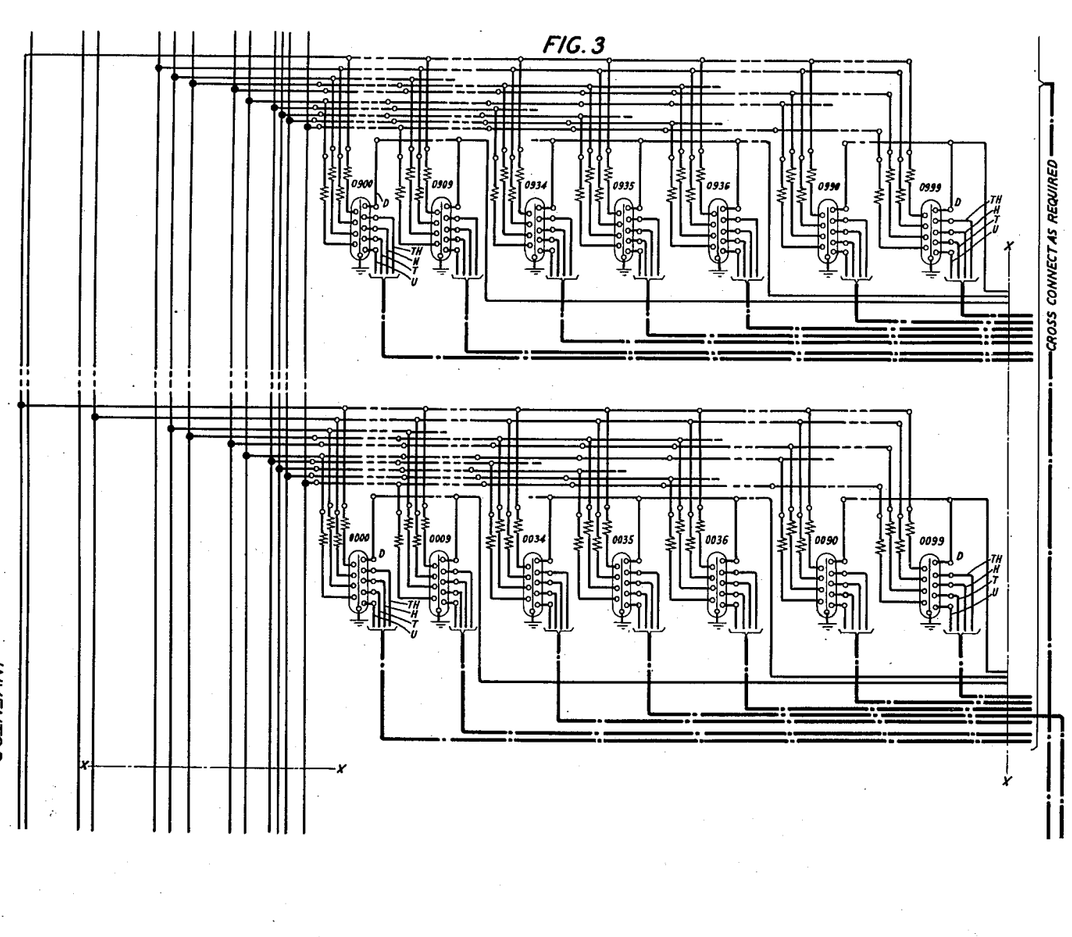
Figure 4:
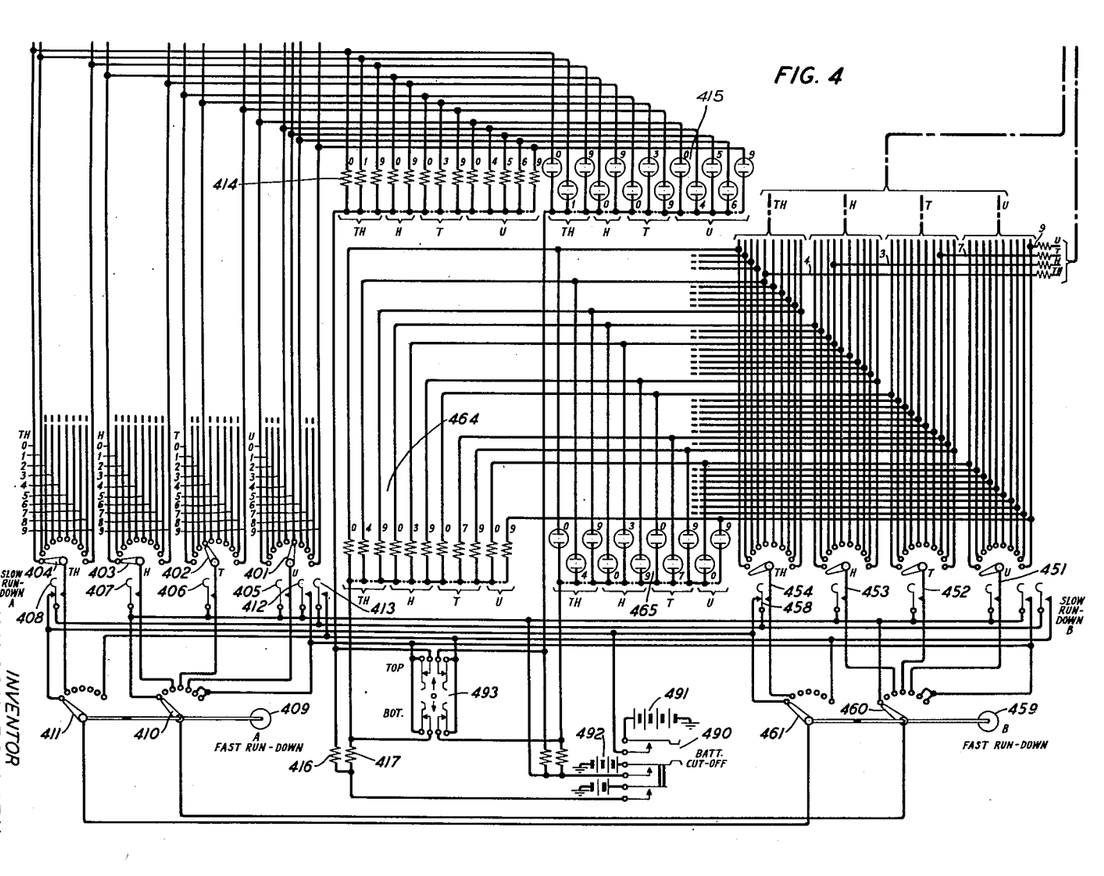

Figs. 2, 3 and 4 when arranged as shown in Fig. 1 show in detail a translator or cross-reference system arranged to translate numbers or items. Such a system requires 10,000 tubes, one for each number or item.

In order to aid in understanding the operation of the system, the tubes and related circuits have been arranged in two groups. The left-hand group of electrodes of each of the tubes and the related control circuits and equipment are shown connected to one group of numbers or designations of the items to be translated. The right-hand electrodes and related control circuits are shown connected to the other group of numbers or other designations of the items. Four selector switches 401, 402, 403 and 404 are provided for controlling the selection of the designation or number of the left-hand group of numbers. These switches are set in accordance with the designation or number for which it is desired to obtain the corresponding translation. A similar group of switches 451, 452, 453 and 454 are provided in case it is desired to enter the translator from the right-hand side with the other designation or number. Assuming, for the purpose of illustration, the number corresponding to the left-hand side of the translator is known and it is desired to obtain the corresponding number from the right-hand side as, for example, the piece-part number is known and it is desired to obtain an inventory number. Under these circumstances the switch 404 is set in accordance with the thousandth digit of the piece-part number, switch 403 is set in accordance with the hundredths digit, switch 402 is likewise set in accordance with the tens digit and 401 in accordance with the units digit. For purposes of illustration switches have been shown set in the drawing in accordance with the number 0035.

Either at the same time or before or after, these switches are set in accordance with the known number or other information, the main battery switch 490 is operated. The operation of main battery switch 490 applies battery to system and tubes thereof through suitable resistors. Positive 55-volt battery is applied through the lower operated contacts of key or switch 490, common resistance 416 and individual resistances 414 to the left-hand anodes of the tubes shown in Figs. 2 and 3. The cathodes of these tubes are connected to ground. However, the magnitude and voltage and various resistors are such that no discharge is initiated through any of the tubes and the voltage is sufficiently low so that if and when a discharge is initiated between any elements of the tubes the discharge will not transfer to the other elements even though the voltage of 55-volts positive through the above-described resistors is connected to the anodes. This voltage is applied to the various anodes to prevent the potential or the voltage of these elements from varying due to stray fields, charges, etc.

Figs. 2 and 3 show four groups of tubes which represent 10,000 tubes. While the tubes may be arranged in any desired manner, and located in any desired position, it is desirable to arrange them in some systematic order at least for the purpose of description. With this in view, the first or upper horizontal row in Fig. 2 shows several tubes of the 9,000 group of tubes. That is, the 1,000 group of tubes which have a first digit of 9. These tubes are numbered in accordance with the incoming numbers on the left-hand side of the translating equipment as shown in Fig. 4. The tubes can be numbered, of course, in accordance with the numbers on the right-hand side or in accordance with any other suitable designation, scheme, or system. However, it is assumed herein that they are numbered or positioned in accordance with the numbers on the left-hand side.

The second row of tubes shows a few tubes of another thousands group which are the tubes having a first digit of 1. It is to be understood, of course, there will be in a complete 10,000 number translator or cross-reference system, seven similar groups of tubes located between the first or top horizontal row of tubes and the second or bottom horizontal row and that 1000 tubes are provided in each row of tubes.

The tubes in Fig. 3 represent the tubes of the tenth or zero thousands group. That is, the tubes having a first digit of zero. In this case, the first row of Fig. 3 represents the 0900 group of tubes, while the second row of tubes of Fig. 3 represents the zero thousands and zero hundreds group of tubes.

One tube similar to the tubes shown in Figs. 3 and 4 is required for each item to be cross-referenced or translated. The invention is not limited to a translator capable of cross-referencing 10,000 items. The translator may be extended to any desired number of items or it may be limited to a lesser number such as a thousand items or less. As employed in the exemplary telephone system set further herein, ten translators each having a capacity of 1,000 items or numbers, are employed. The translators having lesser or greater numbers of items may likewise be employed as required by circumstances.

Assuming now that it is desired to obtain a translation for the number 0035 and that switches 401, 402, 403 and 404 have been set in accordance with this number that switch arms 410, 411, 460 and 461 have been positioned as shown in the drawing, and that battery key 490 has been operated. In addition key 493 will be operated to open its upper contacts. Assume further that it is desired to operate the system step-by-step so that key 408 will be operated first. Upon the operation of key 408, a circuit is completed from the high voltage battery 491 through the upper operated contacts of the battery key 490 through the break contacts of the unoperated key 458 and the operated contacts of key 408 through switch 404 to the zero terminal thereof, under the assumed conditions, and then to the top anode of all of the zero thousands tubes, that is to the top left-hand anode of all of the tubes shown in Fig. 3 and such other additional tubes of the zero thousands as it is necessary or desirable to provide for translating corresponding zero thousands numbers.

The voltage of battery 491 is of sufficient magnitude, say for example, 170 volts to initiate a discharge from the upper left-hand anode of each one of the zero thousands tube to the corresponding cathodes of these tubes which cathodes are all connected to ground. It should be noted that an individual resistor is connected in series with each of the anodes of these tubes. This resistor performs a number of functions including limiting the current flowing through the tubes to a reasonable and safe value, preventing excessive current drain, and also permitting a discharge to be initiated simultaneously to all of the tubes of the zero thousands group. This individual resistor in other words is provided to prevent any lock-out tendency which might tend to interfere with a discharge being initiated through all of the tubes in response to the substantially simultaneous application of voltage to these tubes.

Next, key 407 is operated, the operation of which completes a circuit from the battery 492 through the inner lower operated contacts of battery key 490 and through the operated contacts of key 407 through switch 403 to the zero terminal, with switch 403 in the position shown in the drawing and assumed above, and then to the zero hundreds anodes of all of the cross-reference tubes. Thus as shown in the drawing, this potential is applied to the second anode from the top on the left-hand side of all of the tubes of the second row in Fig. 3. These being zero hundreds tubes of the zero thousands group. This potential is likewise applied to all of the second anodes from the top of the left-hand section of the second row of tubes in Fig. 2 since these tubes are the zero hundreds tubes of the first zero thousands group of tubes. There will be 100 tubes in the zero hundreds and zero thousands, 100 tubes in the zero hundreds of the first 1,000 and 100 in each of the other thousands group making a total of 1,000 tubes having an anode connected to the zero hundreds terminal of switch 403, assuming of course that the full complement of 10,000 tubes is provided. Upon the application of the transfer battery 492 having a potential of say 115 volts for example, no action takes place in any of the tubes except the zero hundreds tubes in the zero thousands group because the transfer voltage of battery 492 is of insufficient magnitude to initiate a discharge through any of the tubes of the translator not already having a discharge current flowing through them.

However, in the case of the tubes of the lower row of Fig. 3 a discharge had previously been initiated through these tubes due to the operation of a key 408. Consequently, the discharge will be initiated by transfer voltage from battery 492 to the hundreds anode of these tubes since the 115-volt battery potential of battery 492 is sufficient to cause the transfer of a discharge through any tube in which a discharge is already flowing.

Here again an individual resistor is connected in series with each of the hundreds anodes to permit the discharge to simultaneously flow through all the hundreds tubes of the zero hundreds and zero thousands group. This resistor also reduces current drain, increases tube life, and reduces contact troubles at the keys and switches.

After key 407 is operated, the next step is to release key 408. Key 408 in being released interrupts the positive potential applied to the thousands anodes of the thousands tubes in the zero thousands group thus interrupting the discharge flowing from all of these anodes. As a result, the discharges flowing through all of the tubes of the zero thousands group of tubes are extinguished except for the discharges between the zero hundreds group of hundreds anodes and the cathodes of the corresponding tubes. In other words, upon the operation of key 408 a discharge is initiated through 1,000 tubes. Upon the operation of key 407 a discharge is initiated or transferred within 100 tubes within the thousands group between additional electrodes of such tubes. Upon the release of key 408, the initial or original discharges are all interrupted leaving a discharge through 100 tubes instead of 1,000 tubes.

The next step is to operate key 406. The operation of key 406 applies the transfer voltage from battery 492 through the battery cut-off key 490 and through switch 402 to the No. 3 terminal thereof which terminal is connected to the third electrode from the top on the left-hand side of all of tubes having a third digit of three in all of the hundreds and thousands groups. In other words, in a 10,000 tube system there are 1,000 tubes of tens anode of which are connected to the No. 3 terminal of switch 402. These anodes likewise have a resistance individual to them connected in series with them for the same reasons as the individual resistors are connected in series with the thousands and hundreds anodes as pointed out above. Inasmuch as this transfer potential is of insufficient magnitude to initiate a discharge through any tube through which a discharge is not already flowing the application of this potential produces no effect upon any of the tubes except the ten tubes of the No. 3 tens group of the zero thousands and zero hundreds group of tubes. In case of these ten tubes the operation of key 406 and the application of a transfer voltage to their tens anode initiates a discharge between or causes a discharge to be transferred from the cathode to the tens anode of these ten tubes.

Next, key 407 is released thus interrupting the discharge through all of the hundreds anodes of the zero hundreds group of tubes and the zero thousands group of tubes leaving a discharge at this time flowing through only ten tubes namely the tubes having number 3 in the tens position, zero in the hundreds position and zero in the thousands position. At this time, the original discharge through 1,000 tubes has been reduced to a discharge through ten tubes all of which is assigned the first three digits of the given number.

Next, key 405 is operated which key applies a transfer potential to the bottom electrode on the left-hand side of all of the tubes having a last digit of five. As before, there will be 1,000 of these tubes in a full complement of 10,000 tubes.

The application of this potential produces no effect upon any of these tubes except the tube assigned the number 0035. For this particular tube a discharge is already flowing between the tens anode and the cathode. A discharge will not be flowing through any other tube having a five in the units digit consequently a discharge will only flow to the units anode of tube 0035.

Next, switch 406 is opened which causes the discharge flowing to the tens anode of all of the tubes in the zero hundreds and zero thousands group having a three in the tens position to be interrupted. In other words, at this time, discharges through all of the tubes except tube 0035 has been extinguished thus selecting the one tube having the assigned number.

Having selected the desired tube, it is only necessary to make the proper translation and obtain the desired cross-connection information or translated number or other symbol. In order to accomplish this, a transfer potential is applied to all of the right-hand anodes of all of the tubes in the array by the operation of key 412. The transfer potential, however, is not sufficient to initiate a discharge through any of these tubes except the tube 0035, under the assumed conditions, which tube already has a discharge flowing between a unit anode on the left-hand side and its cathode. Consequently, current will flow to the right-hand anodes of tube 0035 at this time. The transfer potential is applied to all of these anodes from battery 492, the lower inner operated contacts of key 490, the operated contacts of key 412, contacts of key 493, resistors 464 to the right-hand anodes of all of the tubes of the translator. Also, upon the operation of key 413 and with lower contacts of key 493 closed, a circuit is completed for lighting corresponding lamps 465 indicating the translated number, such as, for example, 4379 with the translator cross-connected as shown in the drawing. Having obtained this information the translator has performed its function and may be restored to normal by momentarily releasing key 490. Thereafter, the translator may be employed to make any translation or obtain cross-reference information in the manner described above. Of course, the previous translation may be maintained upon the output of displaced lamps 465 as long as desired. It is also evident that the output may be employed to operate relays or other devices. This output may be stored upon relays for a later use or stored in any other suitable manner or it may be employed to record the desired information in any suitable manner.

Once the discharge through the right-hand anodes has been initiated or transferred in the manner described above, key 405 may be released which will extinguish the discharge through the lower units anode of the left-hand side thus restoring the left-hand side to normal. If it is desired to check the operation of the translator at this time, it is only necessary to operate key 493 to the center position where it will apply a transfer potential to all of the left-hand anodes of all of the tubes of the array. However, discharges will be initiated to the anode on the left-hand portion of tube 0035 only, these discharges in turn will cause the indicating lamps 415 associated with the right-hand portion of the translator to be lighted. These lamps will thus give a check of the operation of the system. If the original number is obtained it is evident that the translator has operated in a proper manner. As pointed out above, the translator is restored to normal by a momentary release of key 490.

The circuit for lighting the indicating lamps 465 extends from battery 491 through the upper operated contacts of key 490, break contacts of key 408, or of key 458, the operated contacts of key 413, the lower right-hand normal contacts of key 493 to the indicating lamps 465. From the other terminal of indicating lamps 465 the circuit extends to the right-hand anodes of the translator tubes. Under the assumed conditions, the circuit extends to the right-hand anodes of all of these tubes. However, the 170-volt battery 491 is insufficient to cause two tubes i. e., the indicating tubes and the cross-reference tubes to break down in series. This battery is sufficient to cause one tube only to break down, consequently, discharges are not initiated through any of the indicating tubes or any of the cross-reference tubes due merely to the application of the voltage battery 491 to the lower electrodes of all of the indicating tubes 465. However, in the case of tube 0035 a discharge has already been initiated in this tube between the right-hand anodes thereof and the cathodes as described above. Consequently, the voltage of the anodes is sufficiently low so that the application of the 170 volts to the lower anodes of the indicating tubes 465 applies a sufficient voltage drop across the indicating tubes connected to the anodes of tube 435 to initiate discharges through these indicating lamps and indicate the desired cross-reference information. Under the specific circumstances as shown in the drawing and assumed hereinbefore, lower right-hand electrodes of tube 0035 are then cross-connected to the No. 4 lamp of the thousands group, No. 3 lamp of the hundreds group, No. 7 lamp of the tens group and No. 9 lamp of the units group thus giving a translation of the cross-reference number of 4379. It is to be understood that any number may be obtained as a result of the translation of cross-reference system by merely changing the cross-connections between the anodes of the right-hand section of the cross-reference tubes. As shown in the drawing, the system is arranged to translate a four-digit number into another four-digit number. However, any suitable number of digits may be employed and the number on the two sides does not need to have the same or a corresponding number of digits. Furthermore there need be no relationship between the two numbers represented by the electrodes on the two sides of any or all of the tubes.

The circuits for lighting the incoming register lamps 415 is similar to that described above with respect to the output register lamps 465 and operate in substantially the same manner. It is thus apparent that both the supplied number and the cross-reference number or the supplied information and the cross-reference information may be readily obtained by means of the two groups of indicating lamps. As it is pointed out hereinbefore, these lamps may be replaced by any suitable type of receiver, responsive device or other indicator.

It is also possible to supply the proper number to the right-hand section of the translator and obtain from it the corresponding number from the left-hand section. The circuits operate under these circumstances substantially the same as described above.

The system has also been arranged to provide for a rapid obtaining of the cross-reference information and more rapid operation of the system. A fast rundown switch 409 is provided which controls brushes 410 and 411, which brushes cooperate with various other circuits and perform substantially the same functions of the operation and release as the various keys 405, 406, 407 and 408 described above. Each one of these switch arms 410 and 411 has associated with it contacts with which these arms cooperate. The switching arms 410 and 411 are of the bridging brush type so that they make contacts with the succeeding contact terminal before they interrupt the circuit through the previous contact.

Thus, to operate the system on a more rapid basis after it has been restored to normal, both the fast rundown keys 409 and 459 are set to their normal or initial condition. In addition, the switches 401, 402, 403 and 404 are set in accordance with the known information. Of course, if it is desired to enter the translator from the other side, switches 451, 452, 453 and 454 will be set in accordance with the known information to be supplied. Thereafter, assuming that the information is supplied to the left-hand side of the translator, the switch 409, which is controlled by a knob, is turned rapidly from its first position to its second position. The switch arm 411 in moving from its No. 1 position to its No. 2 position, with the switch arm 461 remaining in its normal position, applies the breakdown voltage from battery 491 through the upper operated contacts of key 490, the normal contact and brush arm 461, brush arm 411 and associated No. 2 contact, and No. 0 contact of the switch 404 to the 1,000 tubes in the zero thousands group, assuming that all of these tubes are provided. As the switch continues to rotate, the brush arm 410 makes a contact with its associated third terminal before the brush 411 breaks contact with its associated No. 2 terminal. During this overlap time a discharge will be transferred to the hundreds anode in the zero hundreds group of tubes of the zero thousands group. When the brush arm 411 then leaves the No. 2 contact, it extinguishes the discharges through the other 900 translating tubes.

Upon continued rotation of switch 409 brush arm 410 engages its No. 4 terminal, whereupon discharges are initiated from the tens anode of the tens tube of the zero hundreds group and zero thousands group before the brush arm 410 leaves its associated terminal 3. After ample time has been provided to cause the transfer discharge to take place in the manner described above, the brush arm 410 leaves the terminal No. 3 thus extinguishing all the discharges in all but the tubes in the three tens group of the zero hundreds group and zero thousands group. In this manner, the circuit is advanced step-by-step until finally the desired cross-reference tube is the only tube having discharges remaining through this tube. Thereafter, the switch arm 410 is advanced to the Nos. 6 and 7 terminals which causes the discharges to be transferred in the selected tube to the output electrodes. When switch arm 411 engages its No. 7 terminal output or indicating lamps are lighted. Either set of indicating lamps may be extinguished by the operation of key 493 to either its upper or lower position. In the center both groups of lamps will light when the switch arm 410 engages its associated contacts 6 and 7.

As described herein one of a plurality of tubes is selected by having a discharge flowing through it. When additional output electrodes are required or when desired for other reasons, a group of two or more tubes instead of only one may be finally selected either by having their input electrodes connected in parallel or by omitting one or more of the above described final selecting operations or steps.

If it is desired to cause fast operation when the information is supplied to the right-hand section of the translater, then switch 459 is maintained in its zero or No. 1 position and the switch 459 advanced in the manner similar to that described above for switch 409.

If it is desired switches 409 and 459 may be further operated or the switch replaced by other suitable types of relay electronic, pneumatic or other control apparatus and devices. So long as each successive circuit is closed sufficiently before the preceding one is opened, the circuit will operate in the manner described hereinbefore.

As pointed out hereinbefore, a relatively low potential is applied normally to all of the anodes of the translating tubes to stabilize their operation and prevent or reduce the effects of stray fields or voltages upon various electrodes of these tubes. It has also been pointed out that additional voltages are applied to various electrodes in accordance with the prearranged schedule and the circuits traced for the application of these greater voltages. Upon the application of these greater voltages the lower voltage stabilizing sources are not removed from the circuit. It is noted that these low stabilized voltages are connected to various electrodes on the cross-reference tubes through relatively high resistances. When the high voltages are applied to the various electrodes, they create voltages across these resistors which protect both sources of voltage and at the same time cause the proper voltages as described above to be applied to the various electrodes. When these high voltages are then removed, the lower voltages again control the voltage of the electrodes and maintain the circuits of the tubes and the discharges through these tubes in a stable condition.

Figure 5:
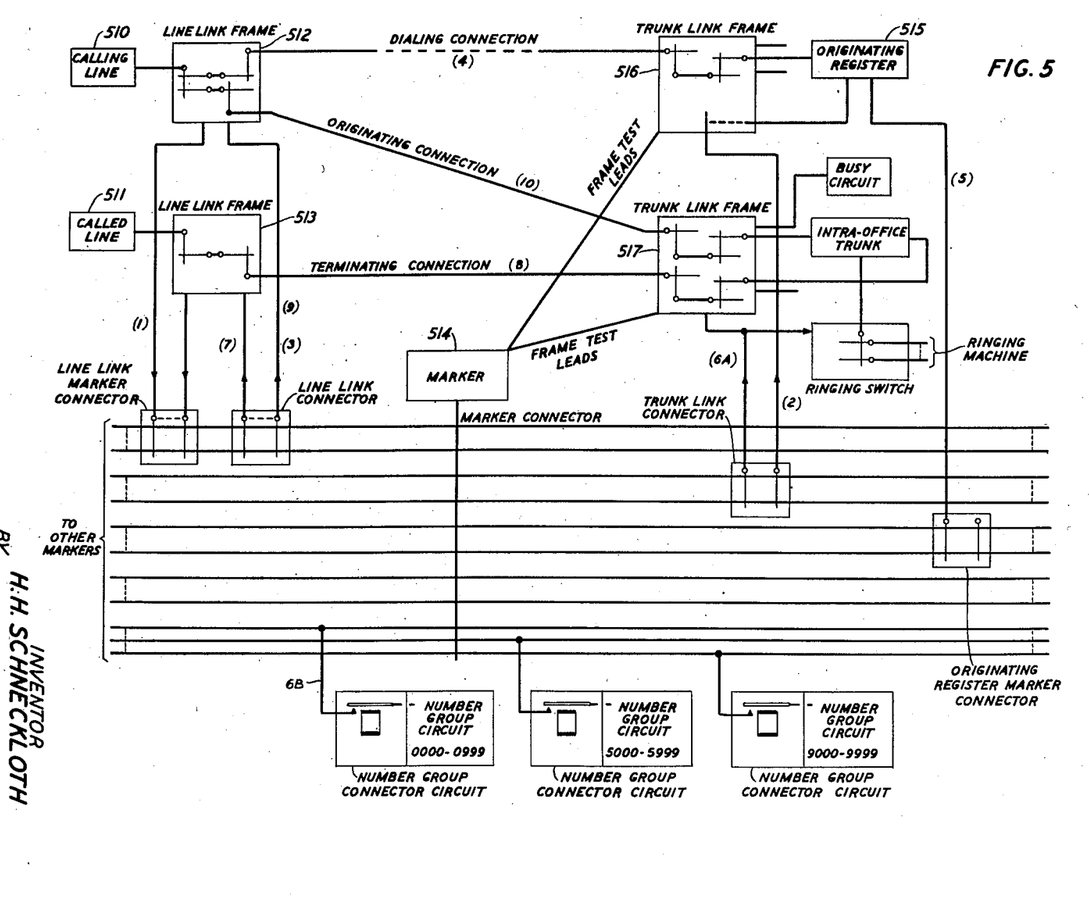
Fig. 5 shows in outline form a portion of No. 5 cross-bar system employing number group circuits arranged in accordance with the translator or cross-reference system in accordance with this invention.

A translator of the type described hereinbefore may be adapted for use as a number group circuit, for example, in automatic switching systems. The outlines of such a system are shown in Fig. 5 together with three of ten such number group circuits sometimes provided in a central office. One of the number group circuits is shown in further detail in Figs. 3, 7, 8 and 9 when arranged adjacent one another as shown in Fig. 6.

The operation of an automatic switching system of the type shown in Fig. 5 is set forth in greater detail in a copending application for United States Letters Patent of Busch, Serial No. 57,394, filed October 29, 1948. Briefly, such a system comprises a plurality of subscribers' lines, a plurality of cross bar switch frames some of which are called line link frames, other trunk link frames and still other types of frames and switches set forth in the above-identified Busch application. The operation of the various switches is controlled by circuits called markers. The marker is arranged so that numerous leads may be extended from various of the other switching frames to the marker circuits and the connections established through this system under control of the marker circuit which circuit is in turn controlled by the dial signals transmitted from the various susberibers' stations.

Briefly, two of a large plurality of subscribers' stations 510 and 511 are shown in Fig. 5. These are connected by means of subscriber lines to line link frames 512 and 513 respectively. When a subscriber, say the subscriber at station 510 for example, initiates a call by removing his receiver from a hook or lifting his handset from its support, a circuit is extended from a subscriber's line 510 to the line link frame 512. Various circuits then respond and establish connections to an idle marker circuit 514 through the line link marker connector and marker connector and circuit paths designated 1 in the drawing. The marker responds to this connection by testing busy leads to find a trunk frame having an idle originating register associated with it. Two such trunk frames 516 and 517 are shown in the drawing. An idle originating register 515 is shown in the drawing connected to the trunk frame 516. Similar circuits normally provided for trunk frame 517 have not been shown in the drawing. It is assumed that the originating registers connected to frame 517 are busy or for some other reason the marker has selected a trunk frame 516 to which an idle originating register 515 is connected. After the marker has selected some one of the trunk frames, say 516, it will then establish connections to the selected frame which connections are indicated by 2. The marker then selects an idle originating register, assumed to be 515, over certain of these paths. The marker also determines over the connection 1 the location of the calling subscriber's line by means of frame numbers and location of the line upon the frames. This information is transmitted to the originating register 515 and stored by the register. Thereafter, the marker selects an idle path through line link frame 512 and the trunk link frame 516 and over a connection between these frames designated 4. Thereafter, a marker is disconnected from the circuit and the originating register 515 supplies dial tone to the calling subscriber. The subscriber dials the number which is recorded by the register 515. After sufficient number of digits have been dialed the register 515 again establishes a connection over a group of connections designated 5 to the same or a different marker circuit. It is assumed herein that it will be the same marker 514. After being connected to the marker the register 515 transfers the dialed information to the marker circuit. The marker circuit will then determine the type of call and the designation of the call. Under the assumed conditions the call is for another subscriber in the same office. Consequently, the marker 514 will select a trunk frame having an idle intraoffice trunk and thereafter the marker establishes connections to the selected frame, say over paths designated 6A in the drawing, and then over the established connections selects an idle intraoffice trunk. At about the same time, the marker circuit 514 also determines the proper number group circuit and transmits the dialed number to the number group circuit. The number group circuit is arranged to translate this number into the line link frame number or designation and then to the position upon that frame where the called subscriber's line terminates. This information is then returned to the marker 514 over the connections designated 6B. Next marker 514 establishes a connection through a connector circuit to the proper line link frame and determines an idle path through the line link frames and trunk link frames to the called subscriber's line. At about the same time the marker circuit sets the ringing circuit associated with the office trunk so that proper ringing signals will be supplied to the called subscriber's station. The marker then establishes a connection to the calling subscriber's line frame under control of the information originally registered in the originating register at the time the marker established a dial connection as described above. The marker then selects and establishes an idle path from the calling subscriber's line to the selected intraoffice trunk. Thereafter, the marker is disconnected and ringing current is applied to the called stations line circuit and supervision of the call is maintained by the intraoffice trunk.

From the above brief description, it is evident that it is necessary to receive a dial number from the calling subscriber's station and then translate this number into symbols or other designations associated with the location of the line terminals upon a terminating line frame by means of the frame number, the designation of the switch on the frame, and the position of the line upon the switch. It is also necessary to determine the type of ringing current to be applied, the type of service to be supplied, the charging information necessary for properly charging for the call and other information. Such a translating circuit embodying the present invention is shown in Figs. 3, 7, 8 and 9 when arranged as shown in Fig. 6.

Figure 7:
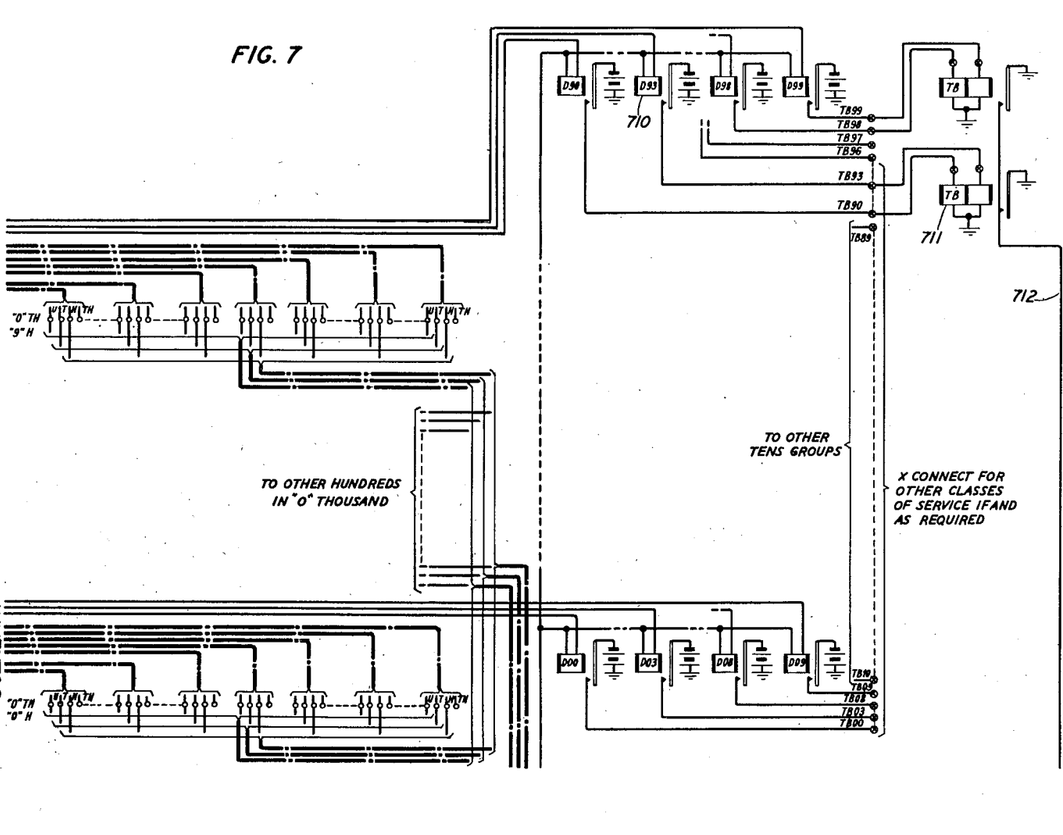
Figure 8:
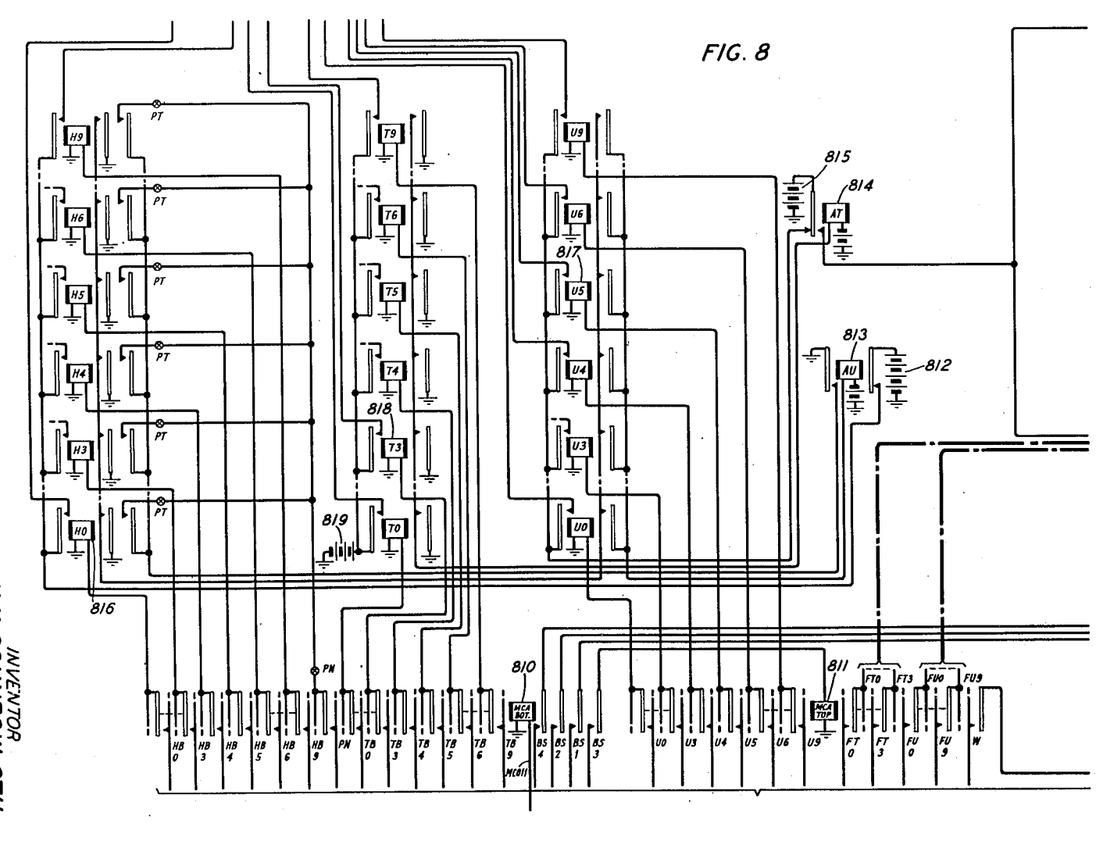

In arranging Figs. 7, 8 and 9 adjacent to Fig. 3 connections are made between Fig. 7 and Fig. 3 and between Fig. 8 and Fig. 3 along the dotted line designated X in Fig. 3. The connections from Fig. 3 to Figs. 2 and 4 are not used.

In the Figs. 3, 7, 8 and 9, only sufficient details of the complete telephone switching system have been shown to understand the present invention and its mode of operation in the manner in which the circuits thereof cooperate with the circuits of an exemplary telephone switching system of the type disclosed in the above-identified copending application of Busch.

Figure 9:
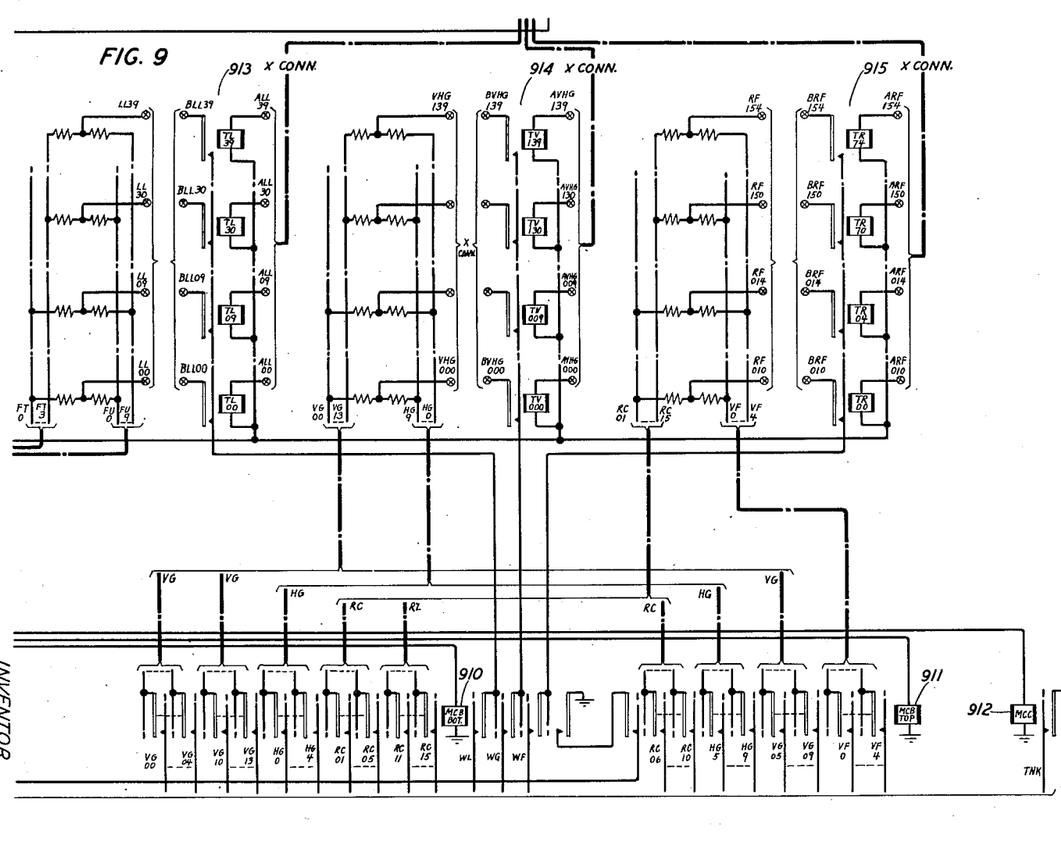

The connections to the marker circuit necessary to understand the operation of the number group circuit in accordance with an exemplary embodiment of this invention are shown across the bottom of Figs. 8 and 9. The connections across the bottom of Figs. 8 and 9 are controlled by a group of relays 810 (MCA BOT), 811 (MCA TOP), 910 (MCB BOT), 911 (MCB TOP) and 912 (MCC). These relays are operated under control of the marker circuit when the marker circuit seizes a number group circuit shown in Figs. 3, 7, 8 and 9. As described above, the marker circuit or some other marker previously used the office designation of the called subscriber's number to select the path or trunk circuit to the proper central office. Under the conditions assumed above the subscriber's number is registered in an originating register and then the same marker is employed to pick a local trunk within the office in the manner described above. In selecting this trunk the first portion of the subscriber's designation number is employed. In large areas this first portion will comprise the first three of a possible eight-digit number, whereas in smaller areas they comprise only one or two digits. The last four digits of the subscriber's number are employed by the marker to determine the subscriber's line within a given office. The marker will employ the first digit of these last four digits to select the proper number group circuit. In other words, the marker will use the thousand digits of the subscriber's number to operate the proper ones of the connecting relays described above to select the desired one of a maximum of ten number group circuits. A group of these relays are provided for each number group and selected by the marker under control of the thousand digit of the subscriber's number. The marker, of course, in establishing a connection to any given number group circuit can only do so provided some other marker is not busy employing the same number group circuit. The marker also in establishing such a connection makes the number group circuit busy so that some other marker may not seize the circuit, until the marker employing these circuits has received the necessary information from the circuit and released it. The detailed circuits and the manner of operation in selecting, testing and seizing one number group circuit is set forth in detail in the Busch application, identified hereinbefore, and made a part of the present specification as if fully included herein.

Assume for purpose of illustration that this is the zero number group circuit and that the dial number is 0035. Upon the seizure and rendering the number group circuit busy the marker will apply battery to one lead or conductor in each of three groups of ten leads depending, upon the dialed number. The marker will apply battery to one of ten hundreds leads, one of ten tens leads and one of ten units leads and to cause the selection of one of a thousand tubes of the type shown in Fig. 3. The marker after seizing the number group will first apply battery to one of the hundreds leads which under the assumed conditions will be the zero hundreds leads and cause the operation of the relay 816 (H0). The operation of this relay then applies a breakdown battery 812 through the break contacts of relay 813, the left-hand operated contacts of relay 816 (H0) to the hundreds anode of the zero hundreds tubes of Fig. 3, that is, the tubes of the lower line of Fig. 3 and such other of the zero hundreds tubes as are provided. This potential initiates the discharge through these tubes between the hundreds anode and the cathode. At about the same time or a little later the marker also applies battery potential to one of the units leads extending to the number group circuit. This potential causes the operation of the corresponding units relay which under the above assumed conditions will be the No. 5 units relay 817 (U5). The operation of relay 817 applies a transfer voltage from battery 815 through the left-hand break contacts of relay 814 and the left-hand operated contacts of relay 817 to the unit anodes of one hundred tubes which represent the hundred numbers which end in 5. Application of this transfer potential causes a discharge to transfer to the units anode in the ten tubes for the numbers having 0 for the hundreds digit and 5 for the units digit. The application of this transfer potential to the units anode of the other 90 tubes produces no effect in these other tubes. Only two such tubes are shown in Fig. 3, namely, tubes 0035 and 0935.

The operation of one of the hundreds relays and one of the units relays such as relay 816 and relay 817 completes a circuit for the operation of the relay 813 from battery through the winding of relay 813, the right-hand outer operated contacts of relay 817 and the right-hand inner operated contacts of relay 816 to ground. The relay 813 then interrupts the battery potential from battery 812 as applied to the hundreds anodes of all of the zero hundreds tubes. Operation of this relay interrupts this potential, extinguishes the discharge through all of the hundreds tubes except those tubes to which the voltage of battery 815 is applied to the units electrodes. In these tubes this transfer voltage has caused a discharge to transfer or flow between the units anode and the cathodes. Consequently, when the relay 813 operates, the discharge between the units anode and cathodes of the ten units tube ending with the digit 5 (assuming they are all supplied) continues but the discharge through the other 90 tubes of zero hundreds group is interrupted.

The operation of relay 813 also applies ground through its left-hand operated contacts and the right-hand outer operated contacts of relay 816 to a lead extending through connecting relay 810 to the marker circuit. This terminal from relay 816 will be cross-connected so that it will be connected through the connecting relay 810 to any one of the three leads extending to the marker circuit. As shown in the drawing this is connected to a lead designated PN indicating that the zero hundreds groups of numbers are so-called physical numbers. If this group of numbers were the so-called theoretical numbers then the lead would be connected to a lead designated TN. If both types of numbers were found in the zero hundreds group this lead would then be connected to a lead designated PTN indicating these facts to the marker circuit. The connection of ground to any one of these three leads extending the marker circuit causes the marker circuit to advance and apply battery to one of the tens leads or conductors which will cause the corresponding tens relay to operate. Under the assumed conditions the marker will cause relay 818 (T3) to operate because the selected number had a second or tens digit of three.

The operation of relay 818 connects a transfer voltage from battery 819 to the ten anodes of the hundred tubes having a tens digit of three; assuming, of course, that all of these tubes are provided in the translator. However, only one of these tubes, namely, tube 0035 will have a discharge flowing through it between the units anode and cathode. The voltage from battery 819 is insufficient to initiate a discharge through any of these other tubes having a tens digit of three. However, in the case of tube 0035 a discharge will be transferred or initiate to the tens anode and cathode upon the application of battery 819 through the tens anode of this tube.

Operation of relay 818 also completes a circuit from ground through its right-hand operated contacts to battery through the winding of relay 814. Relay 814 in operating interrupts the battery 815 applied to the units anode of the tubes having the unit designation of five thus interrupting the discharge through all of these tubes except the discharge of the tens anode and the cathode of tube 0035.

Thus at this time a discharge current flows only through tube 0035. This tube is assigned the number designating the called subscriber's station and has been selected by the proper application of voltages to one after another and after the voltage is applied to one group of anodes it is removed from the previous group before the voltage is applied to a succeeding group of anodes.

The operation of relay 814 also connects the transfer battery 815 through its operated contacts and the windings of the output relays shown in Figs. 7 and 9 to the output anodes of all of the tubes shown in Fig. 3. The contacts of relay 814 are transfer contacts and relay 814 is sufficiently slow in moving its armature between these contacts so that the discharges through all of the tubes other than tube 0035 are extinguished as described above before the armature of relay 814 makes contact with the front contact thereof. Consequently, when armature of relay 814 closes its front contact a discharge is flowing through only one tube, namely, 0035 under the assumed conditions. The transfer voltage of battery 815 is insufficient to initiate a discharge through any of the tubes through which a discharge is not flowing. However, this voltage is sufficient to cause a discharge to transfer from the input or left-hand tens anode and cathode to all of the right-hand anodes of tube 0035. As shown in the drawing in the lower three anodes of this tube are connected to one relay of each of three groups of relays 913, 914 and 915. One of each group of these relays is operated due to the discharge currents through the right-hand lower three anodes of tube 0035 and the cathode thereof. The contacts of these relays are connected to cross-connecting terminals indicated to the left of these relays. The cross-connecting terminals are cross-connected to conductors extending to the marker circuit. The cross-connections in each case are made to indicate the location of the called subscriber's line on the incoming or line link frames of the office. Thus a marker is informed as to the location of the called subscriber's line. The relays 913 and the cross-connections indicate the number of the line link frame. The cross-connections from relays 914 indicate the vertical and horizontal group on this frame in which the called line is located. The cross-connections from relays 915 indicate the vertical file of the location of the called line, the type of ringing current which will be applied to it and other special conditions.

When the marker has received this information it will dismiss the number group circuit which causes the relays to be restored to normal and render the number group circuit free for use by another marker. The marker will then test the called line and if idle establish a connection to it and cause the proper ringing current to be transmitted over the line after which the marker is released and free to be employed in the establishment of another connection. Thereafter the call is controlled from the intraoffice trunk in the manner described in the above-identified Busch patent application.

If the called number had been a PBX or private branch line number the operation of relay 814 will cause a discharge to be initiated through the uppermost right-hand electrode of tube 0035. This electrode is cross-connected to relay 710 and will cause the operation of relay 710 under the assumed conditions. If the number 0035 designates an individual or party line its upper right-hand anode will not be connected to a relay such as 710 or if connected the contacts of relay 710 will not be connected. If, however, this line designates one of a group of lines or trunks extending to a PBX then relay 710 or a similar relay will be connected to its upper right-hand anode and the contacts of relay 710 will be connected to extend the other circuits to the marker, whereupon the marker circuit will test these lines and select an idle one and then determine the location of the idle line and establish connection to it in the manner set forth in the above-identified application of Busch. If the called number 0035 designates a trunk, then relay 710 in operating will either operate relay 711 which will ground the trunk conductor 712 to the marker circuit or relay 710 will ground this lead. Thus, the tube translator in accordance with this invention translates the directory numbers of a called line into the information designating the location of the line upon a switching frame so that a connection may be established to this line.

What is claimed is:

1. An electronic selecting system comprising a plurality of similar multielectrode discharge tubes arranged to identify multidigit numbers, elements conditioned selectively according to the identity of the digits of multidigit numbers, apparatus responsive to and operable under control of said elements conditioned selectively according to a digit of a number for creating discharges between a pair of electrodes in each of a plurality of said tubes, apparatus responsive to and operable under control of said elements conditioned selectively according to another digit of said number for creating other discharges to at least one other electrode of a lesser number of said tubes voltage applying and interrupting apparatus for thereafter maintaining said other discharges and for extinguishing the discharges between at least one electrode of each pair of said first-mentioned electrodes.

2. A translating arrangement comprising a plurality of multielement electron discharge devices, a plurality of electrodes individual to each of said devices, input circuits connected to a plurality of said electrodes individual to each of said devices, output circuits connected to a different plurality of electrodes individual to each of said devices, apparatus for selecting one of said devices comprising means for applying a discharge initiating voltage across certain input electrodes of a plurality of said devices, other apparatus for applying a transfer voltage across a different plurality of said input electrodes for transferring discharges to said different plurality of electrodes and means for thereafter removing the first voltage from said first plurality of electrodes, other apparatus for applying other transfer voltage to other plurality of input electrodes, means for removing the previously applied transfer voltage until one device is selected, apparatus for thereafter applying transfer voltages to said output electrodes for transferring discharges within the selected device to the output electrodes thereof.

3. A multidigit electronic selecting system comprising a plurality of similar multielectrode discharge tubes in which each tube is designated by a multidigit number and individual electrodes of the tubes designated by the respective digits of said number, apparatus for selecting the individual electrodes designated by one digit of a number, means for applying a discharge initiating condition to all of the electrodes of all of said tubes designated by said selected digit, apparatus for selecting the individual electrodes designated by another digit of said number, means for applying transfer voltages to all of the electrodes designated by said other digit of said number, and means for thereafter extinguishing the discharges initiated between the electrodes designated by said first selected digit, and apparatus for selecting the individual electrodes designated by still another digit of said number, means for thereafter applying the transfer voltage to still other electrodes designated by the third selected digit, and other means of extinguishing the discharges initiated by said first transfer voltage.

4. In a telephone communication system, in combination a plurality of gaseous discharge tubes, a plurality of electrodes within said tubes, a plurality of elements controlled by series of telephone dial pulses, apparatus responsive to said elements controlled by telephone dial pulses for applying discharge initiating conditions to a plurality of said tubes under control of one series of dial pulses representing one digit, other apparatus controlled by other of said elements for applying discharge transfer conditions to a different plurality of tubes under control of another series of pulses representing another digit for transferring discharges in a lesser number of tubes, and interrupting apparatus for thereafter removing said first potential from said tubes.

5. In a telephone switching system, a translator for translating the directory number of a subscriber's line into symbols representing the location of termination of said line on a switch comprising a plurality of gaseous conduction tubes each having a plurality of input electrodes and a plurality of output electrodes, means for applying discharge controlling voltages to said input electrodes under control of directory number designations of the subscriber's line, and apparatus for transferring the discharge within one of said tubes to said output electrodes, circuit means for identifying the location of the termination of said subscriber's line, and apparatus for connecting said output electrodes to said circuit means for identifying the location of the termination of said subscriber's line.

6. An electronic selecting system comprising a plurality of similar multielectrode gas discharge tubes, apparatus for applying a discharge initiating voltage between two electrodes of each of a large plurality of said tubes, apparatus for thereafter applying a transfer voltage to a different electrode in each of a plurality of said tubes, means for thereafter interrupting said discharge initiating voltage whereupon discharges will continue to flow through only those tubes having electrodes common to both of said first plurality and said second plurality of electrodes.

7. An electronic selecting system comprising a plurality of similar multielectrode gas discharge tubes, apparatus for applying a discharge initiating voltage between two electrodes of each of a large plurality of said tubes, apparatus for thereafter applying transfer voltage to a different electrode in each of a plurality of said tubes, means for thereafter interrupting said discharge initiating voltage whereupon discharges will continue to flow through only those tubes having electrodes common to both of said first plurality and said second plurality of electrodes, and means for thereafter applying a discharge transfer potential to still a different plurality of electrodes, and means for interrupting said first transfer potential whereby a discharge continues to flow through only those tubes having electrodes of each of said second and third plurality of electrodes.

8. An electronic selecting system for selecting a plurality of similar multielectrode gas discharge tubes from a larger plurality of said tubes comprising apparatus for applying a discharge initiating voltage between two electrodes of each of a large plurality of said tubes, apparatus for thereafter applying a transfer voltage to a different electrode in each of a different plurality of tubes having some tubes in common with said first plurality of tubes, means for thereafter interrupting said discharge initiating voltage, whereupon discharges will continue to flow through a selected number of tubes having electrodes common to both of said first plurality and said second plurality of electrodes.

9. An electronic translating arrangement comprising a plurality of multielement electron discharge devices, a plurality of input electrodes in said devices, a plurality of output electrodes in said devices, input circuits connected to said input electrodes, output circuits connected to said output electrodes, apparatus for selecting a plurality of said tubes comprising means for applying a discharge voltage across certain input electrodes of a plurality of said tubes, other apparatus for applying a transfer voltage to other input electrodes for transferring discharges to said input electrodes of a lesser plurality of tubes having electrodes in both said first and second plurality of electrodes, and means for thereafter removing the first potential from said first plurality of electrodes, other apparatus for thereafter applying transfer potentials to said output electrodes for transferring discharges within said selected tubes to the output electrodes thereof.

10. An electronic translating arrangement comprising a plurality of multielement electron discharge devices, a plurality of input electrodes of said devices, a plurality of output electrodes of said devices, input circuits connected to said input electrodes, output circuits connected to said output electrodes, apparatus for selecting a plurality of said tubes comprising means for applying a discharge voltage across certain input electrodes of a plurality of said tubes, other apparatus for applying a transfer voltage to other input electrodes for transferring discharges to said input electrodes of a lesser plurality of tubes having electrodes in both said first and second plurality of electrodes, and means for thereafter removing the first potential from said first plurality of electrodes, other apparatus for thereafter applying transfer potentials to said output electrodes for transferring discharges within said selected tubes to the output electrodes thereof, other apparatus for applying discharge initiating, means for applying transfer voltages, and means for then removing the previously applied voltage to pluralities of output electrodes for selecting a group of said tubes and other apparatus for thereafter applying transfer voltages to all of said input electrodes whereby translations may be made through said translator in the reverse direction.

11. A translating arrangement comprising a plurality of multielement electron discharge devices, a plurality of electrodes for each of said devices arranged in two groups, apparatus for selecting one of said tubes comprising means for applying a discharge voltage to a plurality of electrodes of one of said groups, other apparatus for applying a transfer voltage to a different plurality of electrodes of said group for transferring discharges to certain electrodes, of said different plurality of electrodes, means for thereafter removing the first voltage from said first plurality of electrodes of said first group, other apparatus for applying other transfer voltages to other pluralities of electrodes of said first group, means for then removing the previously applied transfer voltage until one tube is selected, apparatus for thereafter applying transfer voltages to all of the electrodes of said second group for transferring discharges within the selected tube to the electrodes of the second group thereof, other apparatus for first applying voltages to pluralities of electrodes of said second group of electrodes in a manner similar to the above manner of applying voltages to said first group of electrodes and thereafter applying transfer voltages to said first group of electrodes for operating said translator in a reverse direction.

12. A two-way translator comprising a plurality of electron discharge devices, a plurality of selecting elements each settable in one of the plurality positions, means controlled by one set of said selecting elements for selecting any one of said devices, other means controlled by another set of said selecting elements for selecting the same one of said devices, and circuit components controlled by said selected device for indicating either set of selecting conditions which are required to select said device.

13. A two-way translator comprising a plurality of electron discharge devices, a first and second selecting set having a plurality of selecting members each having a plurality of positions, means controlled by said first selecting set for selecting any one of said devices, apparatus controlled by said selected device for providing an identification to said second selecting set, apparatus controlled by said second selecting set for selecting said device, and means controlled by said selected device for indicating said first set of selecting members.

HARRY H. SCHNECKLOTH.

REFERENCES CITED

The following references are of record in the file of this patent:

UNITED STATES PATENTS

| Number | Name | Date |
| --- | --- | --- |
| 2,270,246 | Bascom | Jan. 20, 1942 |
| 2,284,870 | Holden | June 2, 1942 |
| 2,298,699 | Hubbard | Oct. 13, 1942 |
| 2,319,424 | Maloney | May 18, 1943 |
| 2,326,551 | Mohr | Aug. 10, 1943 |
| 2,348,626 | Holden | May 9, 1944 |